(No Model.)
B. BIDWELL.
ELECTRIC RAILWAY.
No. 315,113. Patented Apr. 7, 1885.
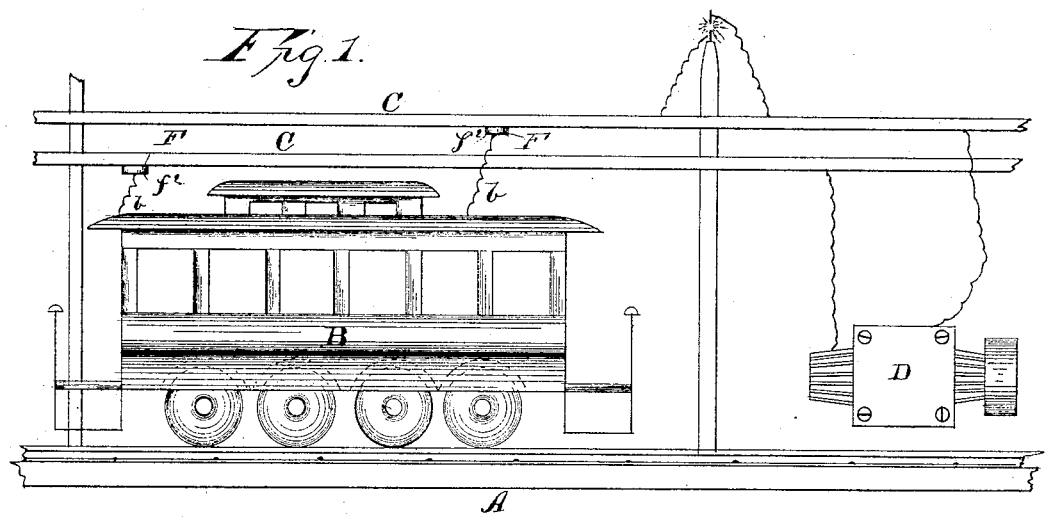
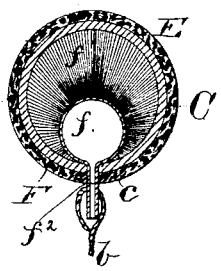
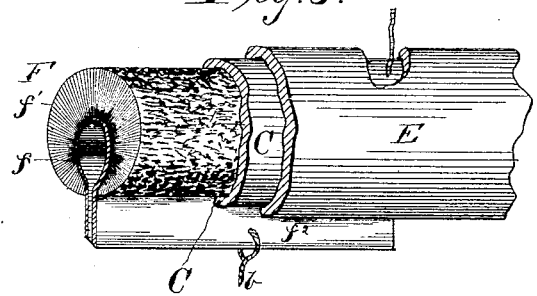
Witnesses:
J. F. Holden
Daniel Scott
Inventor.
Benson Bidwell
per S. J. Van Stavoren
Atty.

United States Patent Office.

BENSON BIDWELL, OF PHILADELPHIA, PENNSYLVANIA.

ELECTRIC RAILWAY.

SPECIFICATION forming part of Letters Patent No. 315,113, dated April 7, 1885.

Application filed September 4, 1884. (No model.)

*To all whom it may concern:*

Be it known that I, BENSON BIDWELL, a citizen of the United States, residing at Philadelphia, in the county of Philadelphia and State of Pennsylvania, have invented certain new and useful Improvements in Electric Railways, of which the following is a specification, reference being had therein to the accompanying drawings, wherein—

Figure 1 represents an elevation of so much of a railway and appurtenances as is necessary to illustrate my invention; Fig. 2, a transverse section of a slotted tubular conductor and of a traveling contact-brush, and Fig. 3 a broken perspective of the same.

My invention has relation to electric railways; and it has for its objects to provide light but rigid conductors for the line-circuit, which conductors are so constructed and arranged that accumulation of dirt or other like foreign matter on the contact-surfaces is avoided; or such surfaces are at all times maintained in a good or clean condition for the traveling contact-brushes to make sure and continuous electrical contact therewith and complete line-circuit to the electromotors in the cars or trains, thereby avoiding all liability of such circuits being broken by failure of the traveling brushes making contact with the conductor-surfaces due to deposits of dirt upon the latter; to preferably coating or covering the extension or non-contact surfaces of the conductors with an insulating or non-conducting substance for the purpose of preventing leakage of the current from the conductors to the external or surrounding atmosphere; and, finally, to traveling contact-brushes adapted to move along in the interior of the conductors and in contact with their inner surfaces.

My invention accordingly consists of the combination, construction, and arrangement of parts, as hereinafter described and claimed, reference particularly, first, to tubular electrical conductors longitudinally slotted and located along the line of way with their slots downward or nearest the ground or track; second, to tubular slotted conductors having interior contact-surfaces and a coating or covering of glass or non-conducting material upon or around their exterior surfaces; and, third, to the combination of traveling contact-brushes with said slotted conductors.

In the drawings, A represents a line of railway, and B a car, which in practice is designed to be furnished with any suitable form of electromotor in gear with the axles, and from the motor lead the wires or conductors $b\ b$.

C C represent the line-wires or conductors, of which there are two, to form a closed metallic circuit for the dynamo or other electric generator represented at D, which is located at a central or other station along the line of way. The electric generator D, or as many of them as are used, supply the conductors C C with the necessary current for operating the electromotors on the cars.

In practice the closed circuit of the line or the generator D is provided with suitable switches to open the circuit whenever desired.

The conductors C C are tubular in cross-section, or are composed of pipe-sections electrically connected, and have longitudinal slots or kerfs $e$ running from end to end of the same. These conductors are mounted upon poles or otherwise supported in proximity to the tracks A, with their slots $e$ turned downwardly, as shown, to prevent dust, snow, rain, &c., accumulating in the bores of the conductors, thereby keeping such surfaces clean or in good condition for obtaining electrical contact therewith. The tubular formation of the conductors C C prevents them from sagging when suspended upon poles or when the contact-brushes move along the same.

To avoid leakage of the current from the outside surfaces of the conductors, they are extensively covered or coated with glass, vulcanized rubber, cement, soft or other rubber tubes, or any suitable non-conducting material, E, as more plainly shown in Figs. 2 and 3.

F F represent the traveling contact-brushes, which are each composed of a tubular body or carriage, $f$, made of metal, and having suitable perforations, in which are seated tufts or single wires $f'$. These wires may be of the same length or of different lengths, as shown, to form an exterior eccentric-shaped brush for the carriage $f$, which also has a depending guide or flange, $f^2$. When the carriage is made of sheet metal, as illustrated, its meeting sides are bent to form said guide or plate $f^2$. The brushes F travel along the bores of the conductors C, and the flanges or guides $f^2$ of the former project through the slots $c$. The wires $f^2$ of brushes make the contact with the inner surfaces of the conductor to complete the circuit of the latter or the generator D by way of wires $b$ to the electric motor upon the cars, the outer end of said wires $b$ being connected to the contact-brush guides $f^2$ in any suitable manner.

If iron pipes are employed for the conductors C, their inner or contact surfaces may be lined with a film of copper, to obtain increased conductivity for the line-current.

In practice I do not limit myself to the particular form of brush shown, as it is clear that many other forms can be used without departing from my invention.

The operation is obvious: The dynamo D and the motors upon the cars being switched on the line-circuit, such motors are set in motion to propel the cars, and as it travels the contact-brushes move therewith to maintain the circuit for the motors and provide for the continued advance or travel of the cars.

In the drawings, I have shown provision for utilizing the line-current for illuminating purposes; but I do not herein claim the same, as it forms the subject-matter of application No. 140,513, filed August 14, 1884; nor do I herein claim the particular form of brush, as that is covered by application No. 122,123, filed February 26, 1884.

What I claim as new is—

1. In an electric railway, a metallic line-circuit composed of tubular conductors having longitudinal slots and interior contact-surfaces, substantially as shown and described.

2. In an electric railway, a metallic line-circuit composed of tubular conductors having longitudinal slots and interior contact-surfaces, said conductors being suitably supported, with their slots turned downwardly or forming the bottom sides of the conductors, substantially as shown and described.

3. In an electric railway, a metallic line-circuit composed of tubular conductors having longitudinal slots, interior contact-surfaces, and an exterior covering or coating of non-conducting material, substantially as shown and described.

4. The tubular conductor C, having longitudinal slot $c$, and interior contact-surfaces, in combination with a movable contact-brush placed in the bore of said conductor, substantially as shown and described.

5. In an electric railway, the combination of a line of way, a car, an electric generator, and a line metallic circuit composed of tubes longitudinally slotted, in the bores of which are movable contact-brushes in circuit with said car, substantially as shown and described.

In testimony whereof I affix my signature in presence of two witnesses.

BENSON BIDWELL.

Witnesses:
E. J. VAN STAVOREN,
CHAS. F. VAN HORN.